United States Patent [19]

Kuo et al.

[11] Patent Number: 5,351,152
[45] Date of Patent: Sep. 27, 1994

[54] DIRECT-VIEW STEREOSCOPIC CONFOCAL MICROSCOPE

[75] Inventors: Pao-Kuang Kuo, Troy; Robert L. Thomas; Lawrence D. Favro, both of Huntington Woods; Li Chen, Detroit, all of Mich.

[73] Assignee: The Board of Governers of Wayne State University, Detroit, Mich.

[21] Appl. No.: 930,927

[22] Filed: Aug. 14, 1992

Related U.S. Application Data

[63] Continuation-in-part of Ser. No. 734,398, Jul. 23, 1991, Pat. No. 5,162,941.

[51] Int. Cl.$^5$ ............................................. G02B 21/22
[52] U.S. Cl. ................................... 359/376; 359/234; 359/372; 359/386; 359/638; 359/640
[58] Field of Search ............................ 359/233–236, 359/368, 376–378, 383, 629, 638–640, 371, 372, 386

[56] References Cited

U.S. PATENT DOCUMENTS 5,161,052  11/1992  Hill ........................................ 359/377

OTHER PUBLICATIONS

R. L. Gregory, An Optical "Solid-Image" Microscope, PROC. Second International Conference on Medical Electronics, Paris, France, Jun. 1959, pp. 591–595.
Direct Recording of Stereoscopic Pairs Obtained From Diskcanning Confocal Light Microscopes Confocal Microscopy Handbook: 1989 Alan Boyde, Chapter 13, 163–168.

Primary Examiner—Loha Ben
Assistant Examiner—James Phan
Attorney, Agent, or Firm—Dykema Gossett

[57] ABSTRACT

A direct-view stereoscopic confocal microscope including a light source, an aperture plate, image collector, and first and second vibrators. The light source is used for illuminating a portion of a specimen and the aperture plate is used for passing a portion of the light emanating from the light source onto a portion of the specimen. The image collector is optically coupled to the illuminated portion of the specimen and acts to separate the image created by the illuminated portion of the specimen from the light illuminating the specimen. A first vibrator is coupled to the specimen for vibrating the specimen along a first axis and the second vibrator is coupled to the image collector, and synchronized with said first vibrator, for vibrating the collecting means along a second axis.

12 Claims, 8 Drawing Sheets

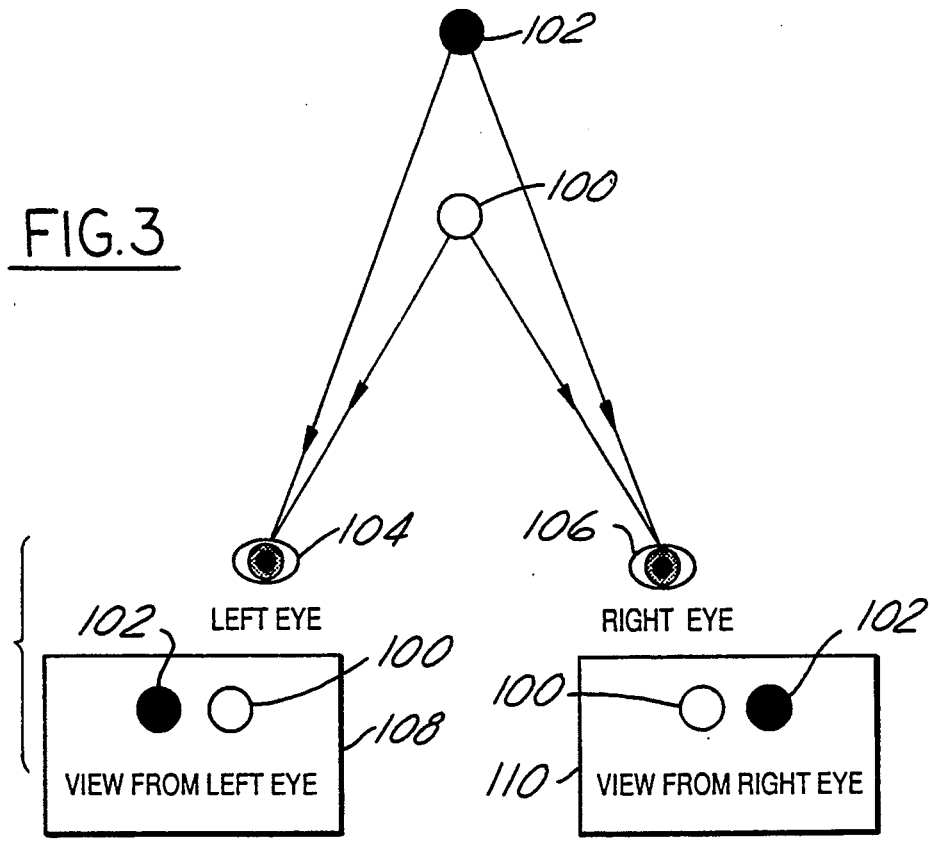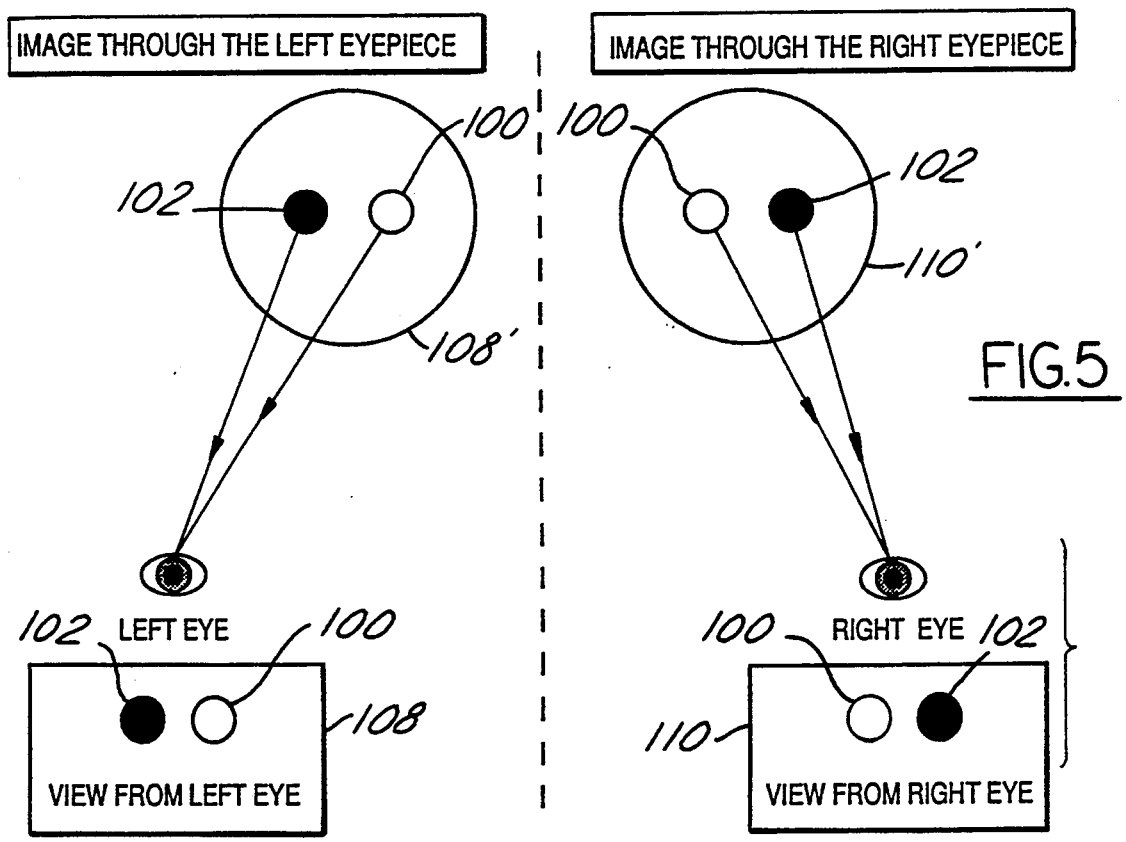

DIRECT-VIEW STEREOSCOPIC CONFOCAL MICROSCOPE

RELATED APPLICATIONS

This application is a continuation-in-part of co-pending application Ser. No. 07/734,398 filed Jul. 23, 1991 now U.S. Pat. No. 5,162,941 issued on Nov. 10,1992.

BACKGROUND OF THE INVENTION

The present invention relates generally to microscopy and more specifically to stereoscopic confocal microscopy.

The art of microscopy deals with the development of methods and instruments for magnifying. A significant portion of microscopy deals with using light from the visible portion of the spectrum to illuminate the sample to be magnified. This aspect of the art of microscopy is known as light microscopy.

It is well understood that many factors influence the maximum attainable axial and lateral resolution using light microscopy techniques. One of these limiting factors is the field size. Specifically, when the field of view of a lens is extremely small, the axial and lateral resolution of the image being magnified can in fact be greater than when the field of view of the lens is broad (or not limited). These theoretical considerations set the stage for the development of an apparatus known as the confocal microscope.

In U.S. Pat. No. 3,013,467 (hereinafter '467) issued on Dec. 19, 1961 to M. Minsky (see FIG. 1), a confocal microscope is disclosed. In this patent, Minsky discloses specimen 22 mounted upon the reflective surface of mirror 15. A beam splitting plate 17 is interposed between the collimating plate or wall 14 and lens 11. The reflective surface of beam splitting plate 17 faces lens 11, while the transparent surface of plate 17 faces pinhole aperture 16.

The light reflected from bulb 10 by reflector 12 is collimated by pinhole aperture 16 of plate 14 to provide a point source of light A. Divergent beam B,B passes through beam splitting plate 17 and then through lens 11 becoming convergent beam C,C. Focal point D of beam C,C is located on specimen 22 and becomes divergent beam E,E which is reflected from mirror 15 back through lens 11. Lens 11 forms convergent beam F,F which is reflected perpendicularly from beam splitting plate 17 as indicated by beams F',F' which converge to their focal point G at pinhole aperture 26 of plate 24. Photoelectric cell 28 is located in alignment with aperture 26 to measure the intensity of the light passing therethrough. Because pinhole apertures 16 and 26 lie upon the optical axis OA of the confocal microscope of FIG. 1, the point source of light A and the specimen point of illumination D both originate on optical axis OA, while the point image G terminates on the optical axis OA. Therefore, all of the light rays accepted by photoelectric cell 28 must pass through specimen 22 at point D on optical axis OA and pass again through optical axis OA at point G. Light scattered from points other than point D of specimen 22 is, for the most part, rejected from the optical system. Such scattered rays may pass through and be refracted by lens 11 but will not be directed to pinhole aperture 26. Rather, this scattered light will strike the body of plate 24 and be rejected from the optical system. Such rays can re-enter the optical system only by again being scattered, and the possibility of this scattering taking place along a line through point D on optical axis OA is remote. Pinhole aperture 26 increases the optical resolution of the system by its action of squaring the intensity pattern distribution of the image defraction.

Because the confocal microscope of FIG. 1 provides a high degree of selectivity, the following advantages are gained:

(1) minimum image blurring,
(2) increase in signal-to-noise ratio,
(3) increase in effective resolution,
(4) high resolution light microscopy through unusually thick and highly scattering specimens, and
(5) very narrow depth of focus.

As was discussed above in conjunction with the prior art confocal microscope of FIG. 1, the optical system disclosed therein brings into focus the light originating at a single point on the optical axis. Thus, if one desires to, look at several portions of sample 22, some means must be provided to move the point of specimen illumination D. Minsky discloses one such means in his '467 patent which involves continually moving (or scanning) sample 22 relative to the optical system. Although this technique works satisfactorily for small samples, larger samples cannot be easily adapted to this type of scanning and alternative methods are used.

One alternative to the above-mentioned method of moving the sample relative to the optical system, involves the technique of moving (or scanning) specimen illumination point D relative to sample 22. Although several different techniques may be used to accomplish the scanning of illmunination point D, a popular technique involves using a spinning opaque wheel 90 (also known as a Nipkow disk) that is perforated by a series of apertures 92. Apertures 92 can be in the form of pinholes (as shown in FIG. 2A) but other aperture geometries are also useable (such as slits). The successive holes are placed at a constant angle apart 94 around the center of disk 90 but on a constantly decreasing radius 96 (i.e. arranged as an Archimedes spiral). The basic idea behind the Nipkow disk is instead of using a single pinhole 16 in plate 14 and moving sample 22, a large number of pinholes are placed in plate 14 thereby providing a means of scanning specimen illumination point D while maintaining specimen 22 stationary. Pinholes 92 are sufficiently separated so that there is no interaction between the images formed by the individual pinholes. The complete image is formed by moving the pinholes so as to fill the space in between them. Typically, moving the pinholes involves rotating disk 90 about its center. The pinhole arrangement seen in the prior art Nipkow disk of FIG. 2A would produce a raster scan pattern across sample 22 as depicted in FIG. 2B.

Although the basic concepts of confocal microscopy are understood and documented (for example see generally *Handbook of Biological Confocal Microscopy*, edited by James B. Pawley, Integrated Microscopy Resource for Biomedical Research University of Wisconsin-Madison, Madison, Wis., revised edition, Plenum Press, New York and London, specifically see Chapter 1, Foundations of Confocal Scanned Imaging in Light Microscopy; Chapter 10, Intermediate Optics in Nipkow Disk Microscopes; and Chapter 11, The Role of the Pinhole in Confocal Imaging Systems, also see *Physics Today*, Sep. 1989, by Gordon S. Kino of Stanford University), current designs continue to be improved upon. For example, notwithstanding the above-mentioned advantages associated with using a Nipkow disk to scan the light source across the sample, a major disadvantage is that the Nipkow disk blocks typically 99% of the illuminating light emunating from bulb 10. This in turn requires the use of a very intense light source (such as an arc lamp or laser). In addition to the above drawback, the use of Nipkow disks also produces a high percentage of reflected light (light which does not pass through the pinhole opening of the disk) which, in turn, causes artifacts in the final image.

A co-pending application Ser. No. 07/734,398 filed Jul. 23, 1991 (hereinafter the '398 application) which is hereby incorporated by reference, sets forth an improved confocal microscope which addresses some of these disadvantages.

One disadvantage which is not addressed is the '398 application is the loss of stereoscopic vision when employing the typical confocal optical microscope.

Stereoscopic viewing is an extremely desirable feature of an optical microscope because it enables the viewer to see the shapes and depth relationships of the various objects in the field of view of the microscope. For low-power microscopes, stereoscopic capability has been implemented (with some degree of success) through the use of conventional optics. However, for high-power (i.e. high magnification microscopes), conventional techniques have been less successful (with the degree of success decreasing proportionate with increasing optical power). The root of this difficulty lies in a fundamental law governing the magnification of any lens, namely that the axial magnification (magnification along the line-of-sight) is always greater than the lateral magnification (magnification perpendicular to the line-of-sight). Specifically, the axial magnification is equal to the square of the lateral magnification. This relationship flows directly from the well-known lens equation. This difference in axial and lateral magnification results in an elongation of the three-dimensional image of the object. This elongation takes place along the axial direction, and (because of the square-law magnification relationship) the degree of elongation increases dramatically with increasing magnifying power of the objective lens. When this elongated image is viewed through the microscopes eyepiece (which necessarily has a finite depth of focus) only a very narrow slice of the image can be in focus (at any given time) for the observer. Consequently, the depth of field (i.e. the in-focus field of view in the axial direction of a conventional high-power microscope) is necessarily restricted to a narrow slice of the three-dimensional object and the sensation of three-dimensionality is largely sacrificed. As a result, the viewer is reduced to the tedious task of observing the object one layer at a time and trying to reconstruct the three-dimensional object from memory after all layers have been observed. Techniques are known for acquiring and storing images at different depths of the object. After the images are acquired and stored, they are reconstructed by projecting them sequentially on a screen which oscillates along the line-of-sight of the viewer. See R. L. Gregory, *The Solid Image Microscope*, Research 13, Pages 422–427 (1960) and Alan Boyde, *Direct Recording Of Steroscopic Pairs Obtained From Disk-Scanning Confocal Light Microscopes*, Chapter 13 of the Handbook of Biological Confocal Microscopy, Pages 163–168. Prior art also exists in which the object distance is varied rapidly as a function of time, the result of which is successively bringing different layers of the object into focus (in effect rapidly scanning through the depth of the object). See R. L. Gregory, *Procedures of the Second International Conference on Medical Electronics*, Paris, France, 1959, edited by C. N. Smyth: London, Iliffe (1960), Page 591. The same effect can be obtained by rapidly oscillating the focusing knob of a conventional microscope.

Although the approach of rapidly oscillating the focusing knob of a conventional microscope does give some sense of three-dimensionality, it is hampered by two problems: (1) the images of the different layers are formed at the same depth of view in the eyepiece so, even though they might be viewed through binocular eyepieces, they are not seen as a three-dimensional image but merely as a succession of two-dimensional images, and (2) the light reflected or scattered (depending on the lighting arrangement) from layers other than the one which is instantaneously ill focus reaches the eyes and presents an annoying out-of-focus background. Because the confocal microscope (by virtue of the attributes which were earlier discussed) has the ability to reject light from layers of the object other than that layer which is currently in focus, its use eliminates the second of the two problems (i.e. the out-of-focus background problem). However, the first enumerated problem (that of achieving the sensation of three-dimensional vision) is not eliminated by virtue of using a conventional confocal microscope.

In low-power stereoscopic microscopes, this first problem is solved by using long focal length objective lenses with small apertures to increase the depth of field for the intermediate image within the microscope. Two objective barrels are used to obtain two views of the intermediate image at slightly different angles for each eye, thus creating the sense of three-dimensionality. This procedure, however, fails for high-power microscopes because their greater magnification cannot be achieved with long focal length objective lenses.

Therefore, there is a need for a high-quality, direct-viewing, high-power, stereoscopic microscope which possesses tile ability of the confocal microscope to reject out-of-focus light and which also possesses the ability to present to the viewer two different angular views of the object.

The present invention achieves these objectives by modifying a conventional confocal microscope. The modified confocal microscope of the present invention operates by sequentially bringing into focus various depths of the object (or specimen) to be viewed. One way of accomplishing this is by varying the specimen distance as in the prior-art microscope described above. This is preferably accomplished by vibrating either the specimen or the objective lens (or some other lens capable of altering the focal plane of the objective lens). Because we are employing a confocal microscope, the out-of-focus background problem is automatically solved. The remaining problem (that of providing a different angular view for each eye) is solved through the introduction of a set of movable prisms (or, alternatively, movable mirrors). These movable prisms (or mirrors) are vibrated in synchronism firstly with one another and secondly with the specimen in such a way as to present images which are at different depths within the specimen and which provide different parallax at the eyes. It is this different parallax which is responsible for the visual sensation of three-dimensionality (both in the real world and in any common stereoscopic viewing system). Devices which have traditionally taken advantage of creating a visual sensation of three-dimensionality by providing different parallax at each eye include the old-fashioned stereoscope and the modern 3-D movies.

One additional problem that is introduced through the use of the confocal principle (which is a problem which that is common to all direct-viewing confocal microscopes) is that of low image brightness. This problem is solved in an alternative embodiment of the present invention through the use of a focusing lens which is placed between the illuminating light source and the pinhole aperture.

SUMMARY OF THE INVENTION

In light of the foregoing objects, in one aspect, the present invention provides a direct-view stereoscopic confocal microscope comprising a light source, an aperture plate, means for collecting an image, and first and second vibrating means. The light source is used to illuminate a portion of the specimen for viewing. The aperture plate is optically disposed between the light source and the specimen and includes an aperture for passing a portion of the light emanating from the light source onto a portion of the specimen. The image collecting means is optically coupled to the illuminated portion of the specimen and is used to collect the image created by the illuminated portion of the specimen. The first vibrating means is coupled to the specimen for vibrating the specimen along a first axis and the second vibrating means is coupled to the collecting means for vibrating the collecting means along a second axis.

The confocal microscope preferably includes a lens placed between the aperture plate and the light source for focusing the light source onto the aperture of the aperture plate. An objective lens is preferably placed between the aperture plate and the specimen for focusing the light passing through the aperture onto the specimen.

Preferably the first and second axes are mutually perpendicular and preferably, the first and second vibrating means vibrate in synchronism.

The aperture plate preferably includes a plurality of apertures and the focusing means preferably includes a plurality of lenses, each of which is respectively associated with an aperture in the aperture plate. Preferably, the confocal microscope includes a rotating device which is coupled to the aperture plate and the focusing means and is functional to rotate the aperture plate and the focusing means in synchronism about a common axis of rotation.

In a preferred embodiment, the collecting means includes a beam splitter and a pair of 90 degree prisms. Alternatively, the collecting means includes a beam splitter and a pair of moving mirrors.

Preferably, the collecting means includes a quarter wave plate disposed between the aperture plate and the objective means and a polarizing beam splitter disposed between the aperture plate and the light source. The quarter wave plate and polarizing beam splitter work together to collect the image by separating the light scattered from the specimen from the light emanating from the light source.

Preferably the light source provides polarized light and preferably generates that polarized light from a source of laser light.

In a second preferred embodiment of the present invention a direct-view stereoscopic confocal microscope includes a light source, an aperture plate, image collecting means, focus adjustment means, and first and second vibrating means. This second preferred embodiment operates substantially the same as the first preferred embodiment except it includes a focus adjustment means optically disposed between the aperture plate and the specimen for varying the depth within the specimen to which the light source is focused. In this embodiment, the first vibrating means is coupled to the focus adjustment means for vibrating the focus adjustment means along the first axis.

Preferably, the focus adjustment means includes a meniscus lens or a prism reflector.

BRIEF DESCRIPTION OF DRAWINGS

FIG. 3 is a depiction of the images seen by the left and right eyes when viewing an actual three-dimensional object.

FIG. 5 is a depiction of the separate images seen by the left and right eyes when viewing an actual three-dimensional object through a direct-view stereoscopic confocal optical microscope.

DETAILED DESCRIPTION OF THE PREFERRED EMBODIMENTS

Figure 1:
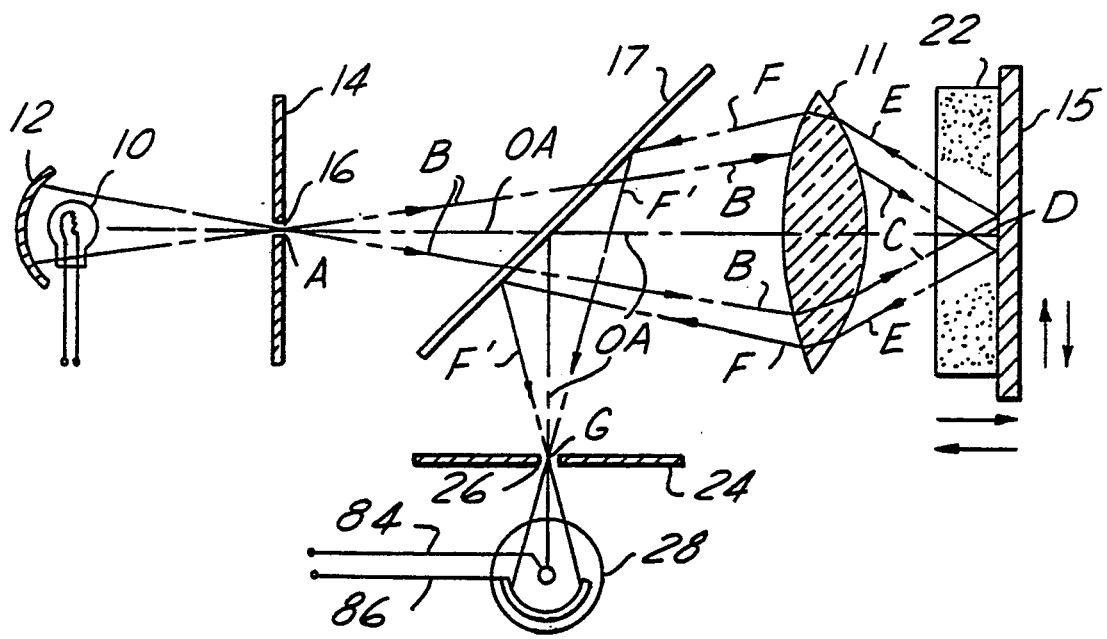
FIG. 1 is a diagrammatic depiction of a prior art confocal microscope.

Now referring to FIG. 3, in order to explain the operation of the confocal microscope of the present invention, it is beneficial to first explain the physiological and psychological principles upon which its operation is based. FIG. 1 depicts first and second objects 100, 102 respectively wherein object 102 is further than object 100 from the eyes 104, 106 of a viewer. In this case, if the viewer were to temporarily block the vision from the right eye, the view from the left eye would appear as that depicted in 108. Likewise, if the vision from the left eye is temporarily blocked, the view from the right eye would be that view depicted at 110. From the depictions of 108, 110 we see that the right eye sees the further of the two objects (object 102) to the right of the closer object (object 100), while the left eye sees the further object to the left of the closer one. This apparent shifting in the objects is due to the different angles in which the eyes view objects 100, 102 and is commonly known as parallax.

Although FIG. 3 accurately depicts how objects are viewed when only using one eye, this is not the way in which objects are normally viewed. Normally, both eyes are used simultaneously. If both eyes are used simultaneously and are focused at a point which is not coincident with object 100 or object 102, the brain will be presented with a field of four objects (a double image of object 100 and a double image of object 102). This situation is depicted in box 112 of FIG. 4.

Figure 4:
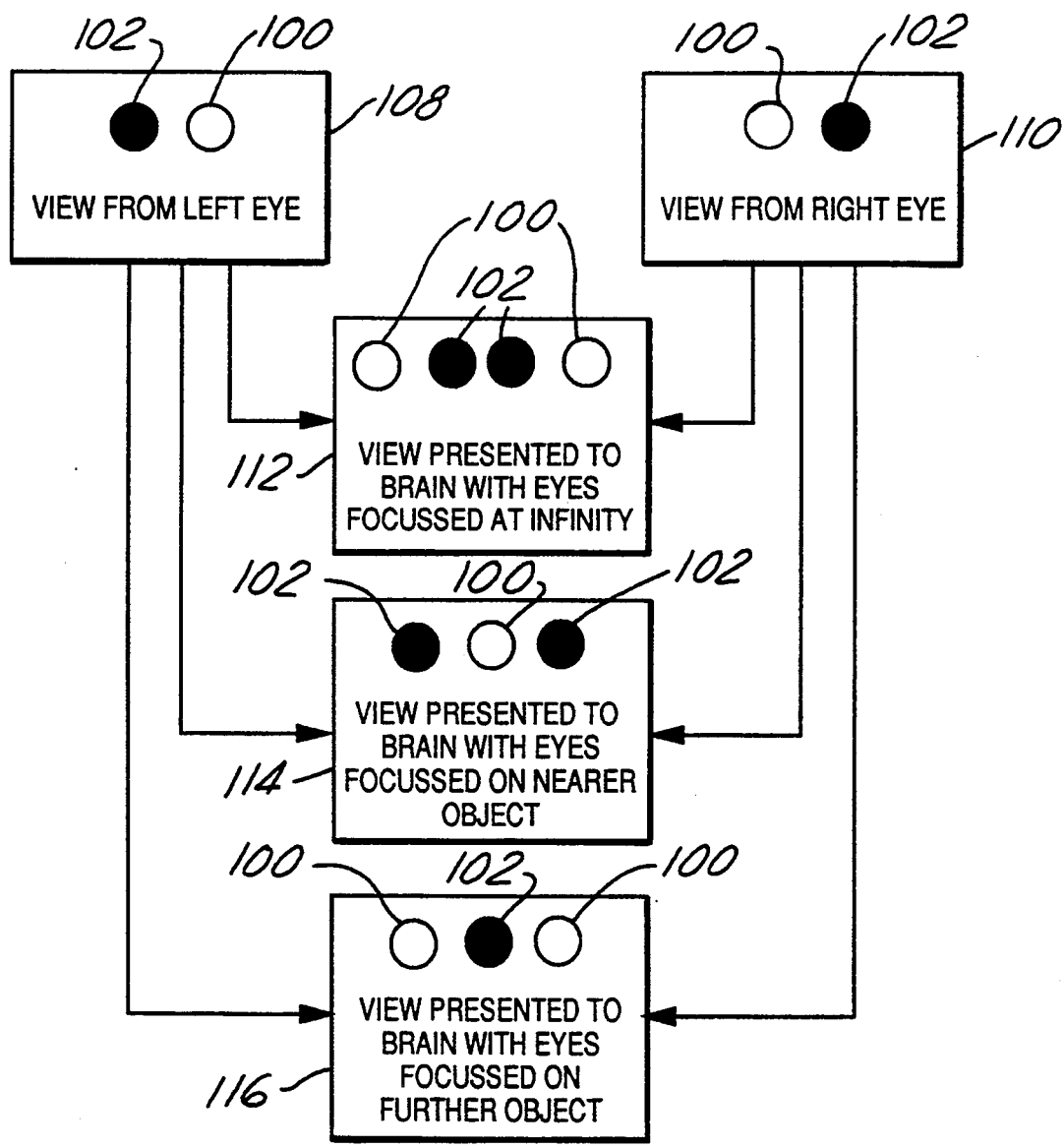
FIG. 4 is a depiction of the views presented to the brain when the eyes view an actual three-dimensional object under three differing focusing conditions.

Now referring to FIG. 4, in order for the brain to make sense from the two different views being presented to it (one view 108 and the second view 110), it trains (or instructs) the eyes to collectively focus on object 100 or object 102. This is accomplished by the brain directing the eye muscles to rotate (either inwardly or outwardly) to bring the fields of the two images 108, 110 into coincidence in the visual field of the brain. The result is that the brain now registers three images (a double image of object 102 and a single image of object 100, set out in 114, or a double image of object 100 and a single image of object 102, set out in 116). Under these conditions the brain is able to concentrate on one of the three images 114, and 116 which is currently "in focus." Thus, as depicted in FIG. 4, if the eyes are focused on object 100, the view presented to the brain will be that view as set out in 114. Likewise, if the eyes are focused on object 102, the view presented to the brain will be that view set out in 116. If the eyes are focused at infinity, the view presented to the brain will be that view set out at 112. In views 114, 116 where the eyes are focused on one of the objects 100, 102, the "out-of-focus object" is ignored by the brain. For example, when the eyes are focused on object 100, as depicted at 114, object 102 is ignored by the brain leaving object 100 as the sole object in the brain's visual field. The psychological sensation of three-dimensionality in an image results from the continual inward and outward rotation of the eyes between first and second objects 100, 102. This continual action brings the images of the first object 100, into focus 114 for a short period of time and then brings the image of the second object 102 into focus for a short period of time 116. By doing this, the brain is able to concentrate on each of the objects in succession thereby giving rise to the sensation of three-dimensionality.

Although the present discussion has inferred that for one object to be "in focus " necessitates that the other object be "out-of-focus ", this is not necessarily the case. For example, in case 114, the two "out-of-focus " objects 102 need not be in fact out-of-focus (in the sense of being blurred). They are simply not coincident in tile visual field therefore the brain ignores them. In fact, the "stereoscopic pairs" of images that are used to produce the sensation of three-dimensionality in the old-fashioned stereoscope, or in the more modern stereoscopic 3-D movies, usually have all of the objects (in the field of view) in focus. When one views an actual three-dimensional scene (such as a landscape, etc. ) there is often also an actual blurring of the "out-of-focus " pairs of images because of the limited depth of field of the human eye. In fact, it is the absence of this blurring effect (which naturally occurs when viewing a three-dimensional scene) that is responsible for the impression of surrealism that accompanies the viewing of stereoscopic pairs in a stereoscope. The present invention includes a confocal microscope that presents stereoscopic pairs of images to the eyes with the images from all depths in the object field focused in the same image plane. In this sense, the present invention operates like pairs of photographs in a stereoscope. This principle is illustrated in FIG. 5 in which objects 100, 102 are viewed by the left and right eye respectively through their respective left and right eyepieces 108', 110'. Thus, FIG. 5 depicts the view of first and second objects 100, 102 as seen in the direct-view stereoscopic confocal optical microscope of the present invention. Note that the images presented to the eyes are identical to those images presented to the eyes when an actual three-dimensional object is viewed by the unaided eyes (see FIG. 3). In FIG. 5, the images of objects 100, 102 are presented in the same plane, at the same distance, rather than one behind the other at different distances. However, they are presented in a manner which reflects the parallax for each eye thereby appearing as if they actually are at different distances. As explained above, it is this different parallax (or at least the perception of parallax) at each eye which is responsible for the sensation of three-dimensionality. Thus, objects viewed with the microscope of the present invention will be seen as if the observer were viewing an actual three-dimensional object and, accordingly, the sensation discussed in conjunction with FIG. 4 likewise will occur. The mechanism for obtaining the different parallax at each eye (and hence the sensation of three-dimensionality) will now be explained.

Figure 6:
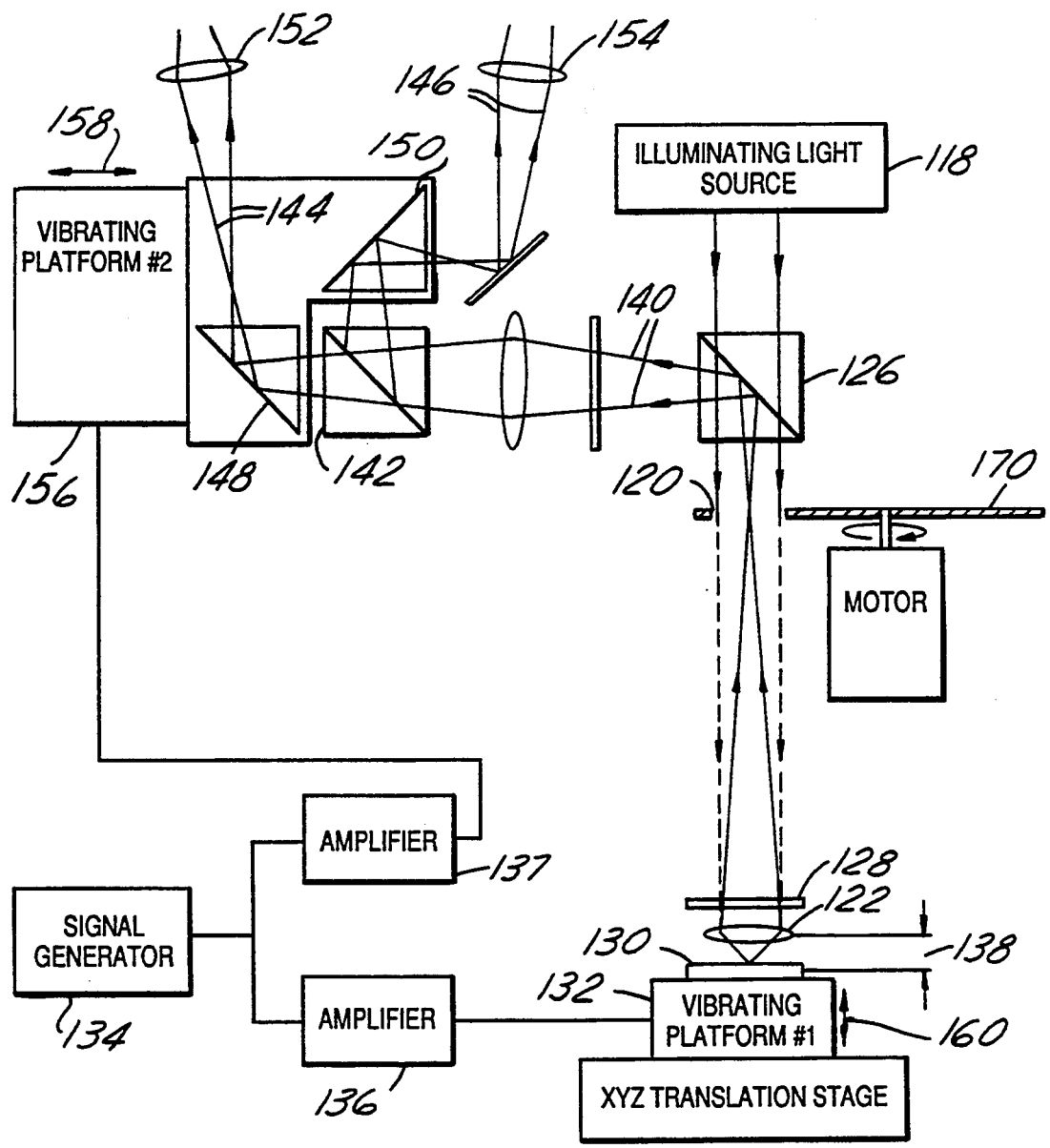
FIG. 6 is a diagrammatic view of a first embodiment of the direct-view stereoscopic confocal microscope of the present invention employing dual 90 degree prisms and a vibrating specimen platform.

Now referring to FIG. 6, the direct-view stereoscopic confocal microscope of the present invention employs some components which are well-known to any confocal microscope. These components include illuminating light source 118, pinhole 120 (shown much larger than that typically employed), objective lens 122, and polarizing beam splitter 126, and quarter wave plate 128. These aforementioned components are all components which were discussed previously in conjunction with the prior art confocal microscope and their function is well understood by those skilled in the art. Accordingly, a detailed discussion of these components and their operation is unnecessary. As was mentioned earlier, because the microscope of the present invention takes advantage of confocal microscope technology, it produces an image having a very narrow depth of field. It also shows the advantage associated with all confocal microscopes of eliminating light from the out-of-focus layers of the specimen (microscopes having this capability are typically described as having as a high rejection ratio). Thus, it is capable of viewing a very thin layer of the specimen in very sharp focus while admitting very little background light from other layers. In the present invention, the conventional confocal microscope is modified in two primary ways. Firstly, specimen 130 (or as we shall see in alternative embodiments objective lens 122) is mounted on a first vibrating platform 132. Thus, when platform 132 is vibrated by way of a signal generated by signal generator 134 and amplified by amplifier 136, different portions of specimen 130 are brought into focus. Specifically, at each time instant or phase of the vibration, distance 138 is varied thereby bringing different depths of the specimen into focus in the same plane. The result is that the viewers eye is presented with a series of in-focus images of different layers of specimen 130 in a repeating succession. All of these images are in the same focal plane, and hence they all are within the depth of focus of the eyepiece. If the vibration frequency of platform 132 is sufficiently high, the well-known persistance of images in the eye will act to convey the impression that all of these images of different layers of specimen 130 are present at the same time. This is similar to the previously referenced prior art which had a varying object difference, but now with the additional benefits of the confocal microscope's ability to reject light from layers which are not in focus at any given instance of time. However, as explained above, such an image does not possess any three-dimensional properties. To achieve three-dimensionality, the eyes must be presented with images which are generated using the scheme set out in conjunction with FIG. 5. That scheme will now be discussed.

In order to provide the sensation of three-dimensionality to the viewer, two different views of specimen 130 must be presented. This is accomplished by bifurcating optical path 140 of the image of specimen 130. Beam splitter 142 is employed to create this bifurcation which creates beams 144, 146. Each bifurcation 144, 146 falls upon its own respective 90 degree prism 148, 150 where they each are directed through a respectively associated eyepiece 152, 154. Prisms 148, 150 are mounted on second vibrating platform 156 which is adapted to vibrate prisms 148, 150 in synchronism. The relative angles of prisms 148, 150 can be adjusted to produce a parallax corresponding to a certain desirable image distance. Preferably, second vibrating platform 156 is adapted to vibrate in an optical axis coincident with an axis lying in a plane perpendicular to the line-of-sight of objective lens 122. Specifically, second vibrating platform 156 is preferably adapted to vibrate in an axis which is mutually perpendicular to axis 160. As platform 156 vibrates, it changes the parallax between the views in eyepieces 152, 154 and does so in such a way that the parallax of the images in bifurcated paths 144, 146 alternates between two in-focus conditions (alternates between views 114 and 116 as described in conjunction with FIG. 4). When second vibrating platform 156 moves prisms 148, 150 in synchronism with first vibrating platform 132 (and if the relative phases between first and second vibrating platforms 132, 156 are properly chosen), the images of deeper layers within specimen 130 will be shifted to the right for the right eye and to the left for the left eye, thereby creating the desired three-dimensional effect. A reversal of the phase of relative vibration can actually show the object in three-dimensions, but appearing "upside down" (i.e. the further layers being shifted to the left and the right eye and to the right and the left eye ). Since the amount of parallax is controlled by the amplitude of the vibration of second vibrating platform 156, it is also possible to vary this amplitude and therefore to vary the apparent longitudinal elongation (or depth) of the three-dimensional image.

Figure 7:
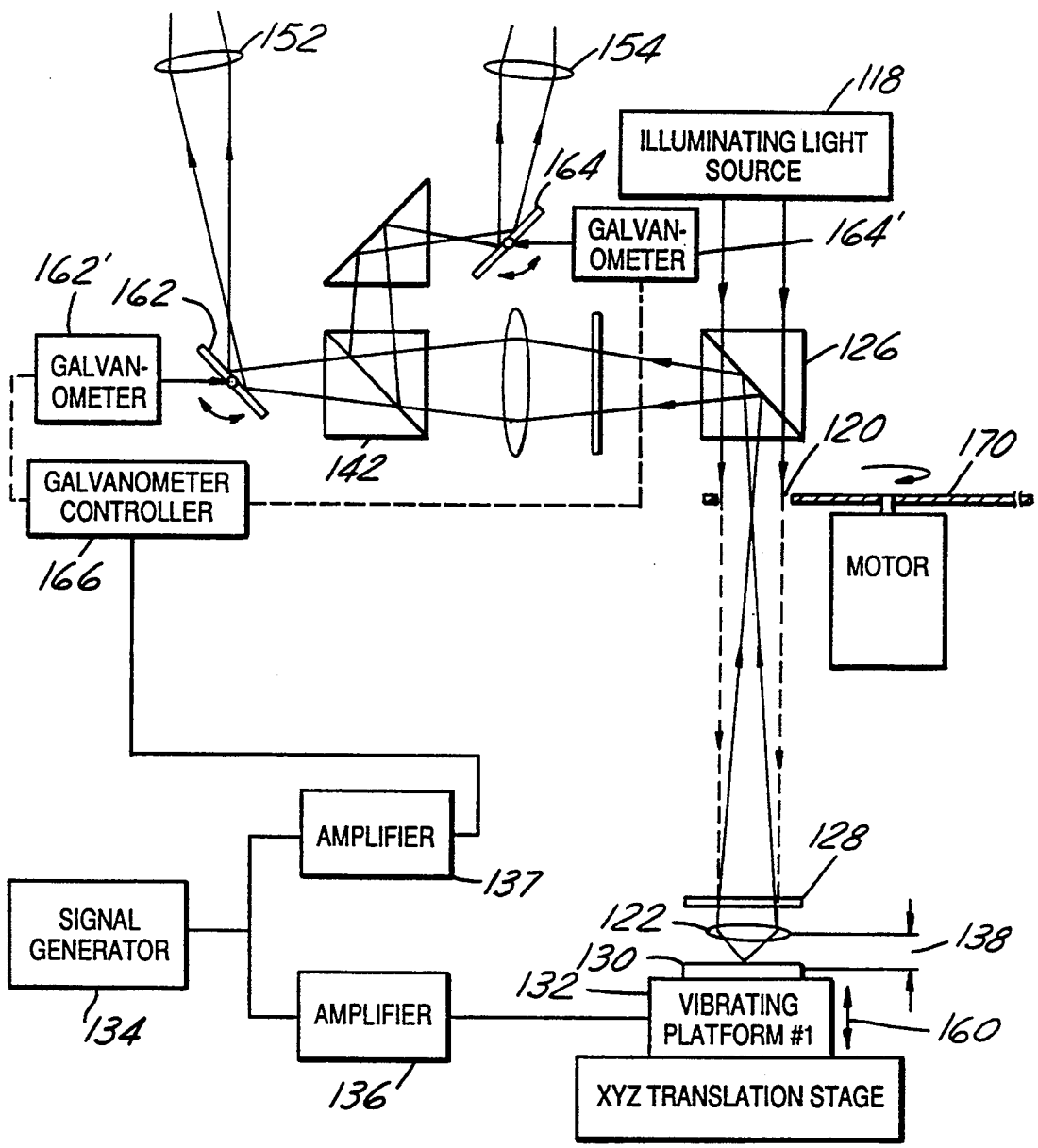
FIG. 7 is a diagrammatic view of a second embodiment of the direct-view stereoscopic confocal microscope of the present invention employing a pair of moving mirrors.

Thus, in view of the above discussion, it is seen that the direct-view stereoscopic confocal microscope of the present invention is effective for presenting to an observer a real-time, three-dimensional view of a specimen. Of course the confocal microscope of the present invention is not limited to the use of 90 degree prisms 148, 150 for shifting the image along axis 158. For example, depicted in FIG. 7 is a second embodiment of the present invention wherein the function of prisms 148, 150 is duplicated by the use of moving mirrors 162, 164 attached to their respectively associated galvanometers 162', 164'. Galvanometer controller 166 is provided to control the operation of galvanometers 162', 164'. With the exception of galvanometers 162', 164' and galvanometer controller 166, the embodiment set forth in FIG. 7 operates identical to the embodiment set out in FIG. 6 and, accordingly, a detailed discussion is unnecessary.

IMAGE INTENSITY CONSIDERATIONS

Figure 2A:
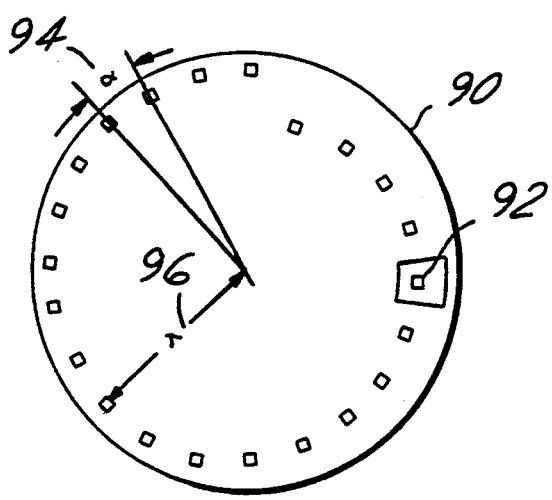
FIG. 2A is a front view of a typical prior art Nipkow disk.
Figure 2B:
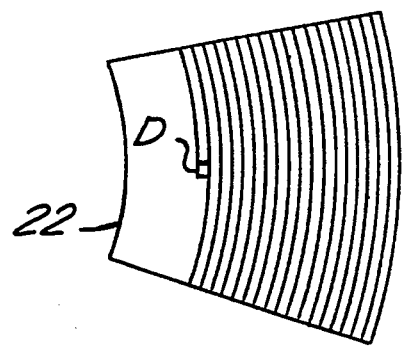
FIG. 2B is a diagrammatic depiction of the scanning sequence created by the prior art Nipkow disk of FIG. 2A when employed in the confocal microscope arrangement of FIG. 1.
Figure 8:
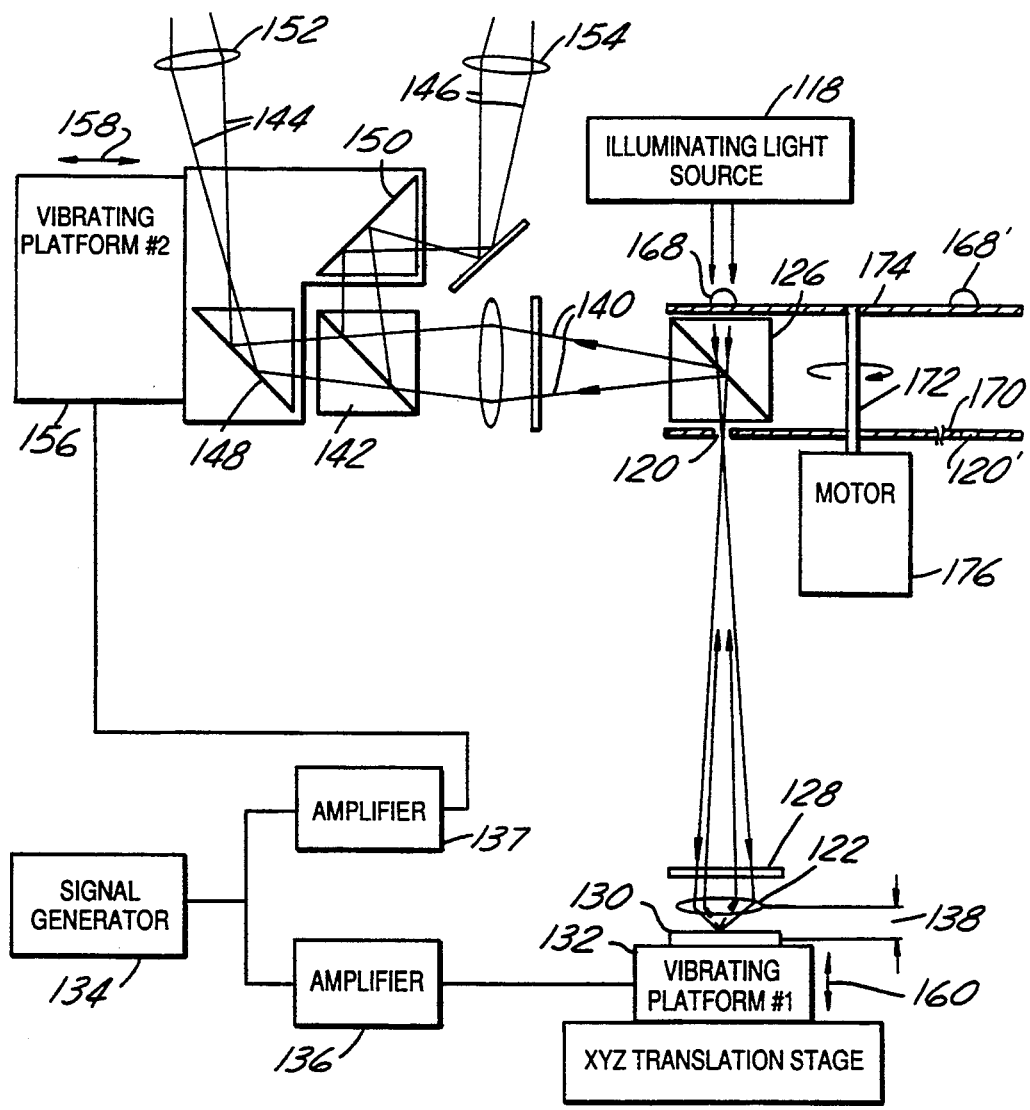
FIG. 8 is a diagrammatic view of a third embodiment of the direct-view stereoscopic confocal microscope of the present invention employing focusing means between the illuminating light source and the pinhole of the Nipkow disk.

Now referring to FIG. 8, the modulation of distance 138 in a confocal microscope implies that the image at a certain depth within specimen 130 exists only for a brief period of time. This also implies that only a small fraction of the available light is available to "image" at any given depth. Thus, the demand on image brightness, and hence the brightness of the light source in a vibrating-objective microscope, is extremely high. In a confocal version of such a microscope, this problem is exacerbated by the low intrinsic brightness of the confocal microscope. This low intrinsic brightness is due to the fact that pinhole 120 passes only a small portion of the light emanating from light source 118. FIG. 8 sets forth a preferred embodiment of the direct-view stereoscopic confocal microscope of FIG. 6. This preferred embodiment employs focusing lens 168 for focusing the light emanating from light source 118 onto pinhole 120. Because disk 170 is normally adapted with a plurality of pinholes as was earlier discussed in conjunction with FIG. 2A, and, is also normally adapted to rotate about axis 172, plate 174 is preferably adapted to rotate about axis 172 and also preferably includes at least one lens for each corresponding pinhole. Thus, as motor 176 rotates disk 170 and plate 174 about axis 172, specimen 130 is scanned in the manner earlier discussed in conjunction with FIG. 2B. Because focusing element 168 acts to concentrate the light emanating from source 118 onto its respective pinhole 120, a brighter image is generated than that which would be otherwise possible.

OTHER PREFERRED EMBODIMENTS

Figure 9:
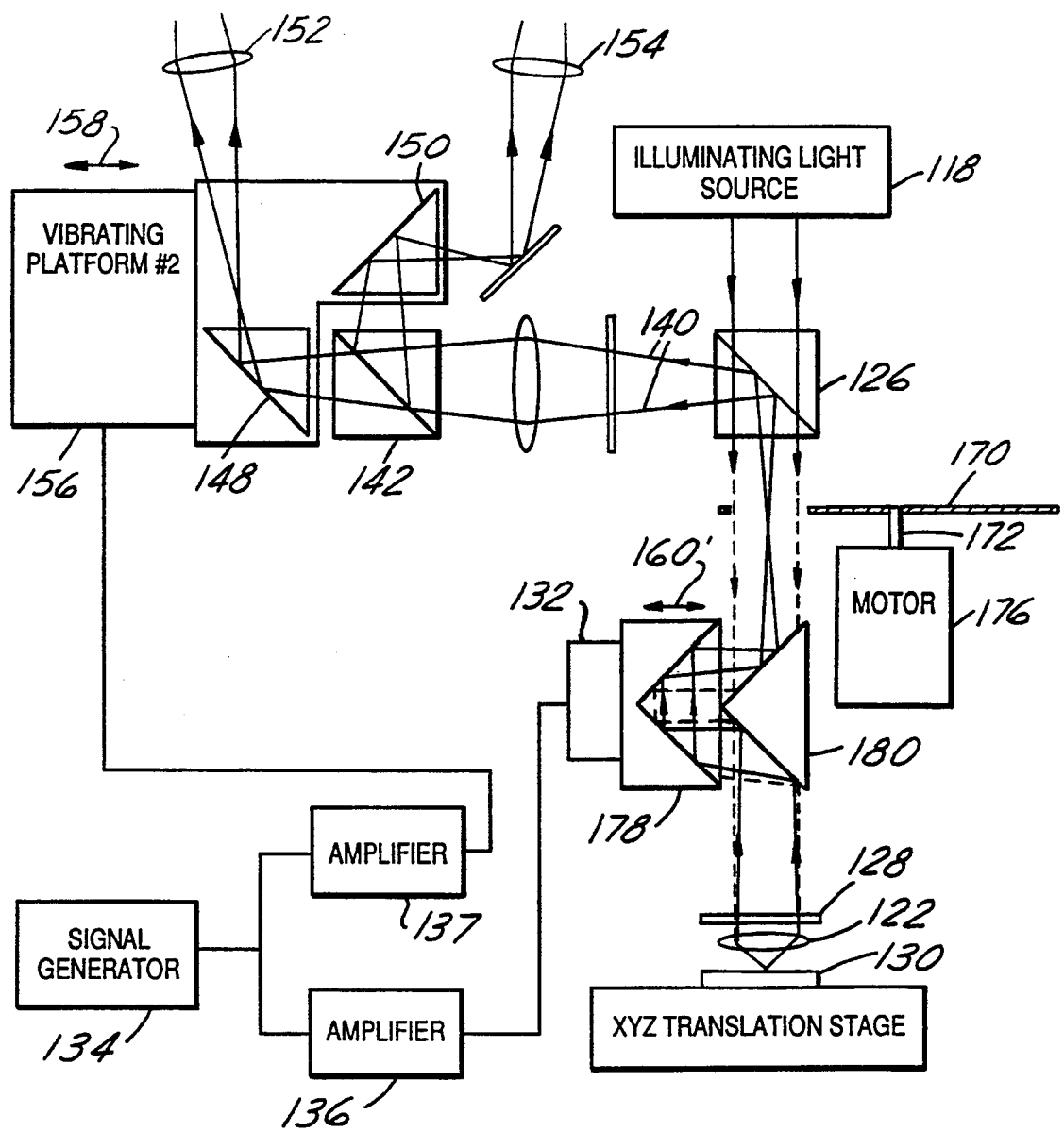
FIG. 9 is a diagrammatic view of a fourth embodiment of the direct-view stereoscopic confocal microscope of the present invention employing a prism reflector.
Figure 10:
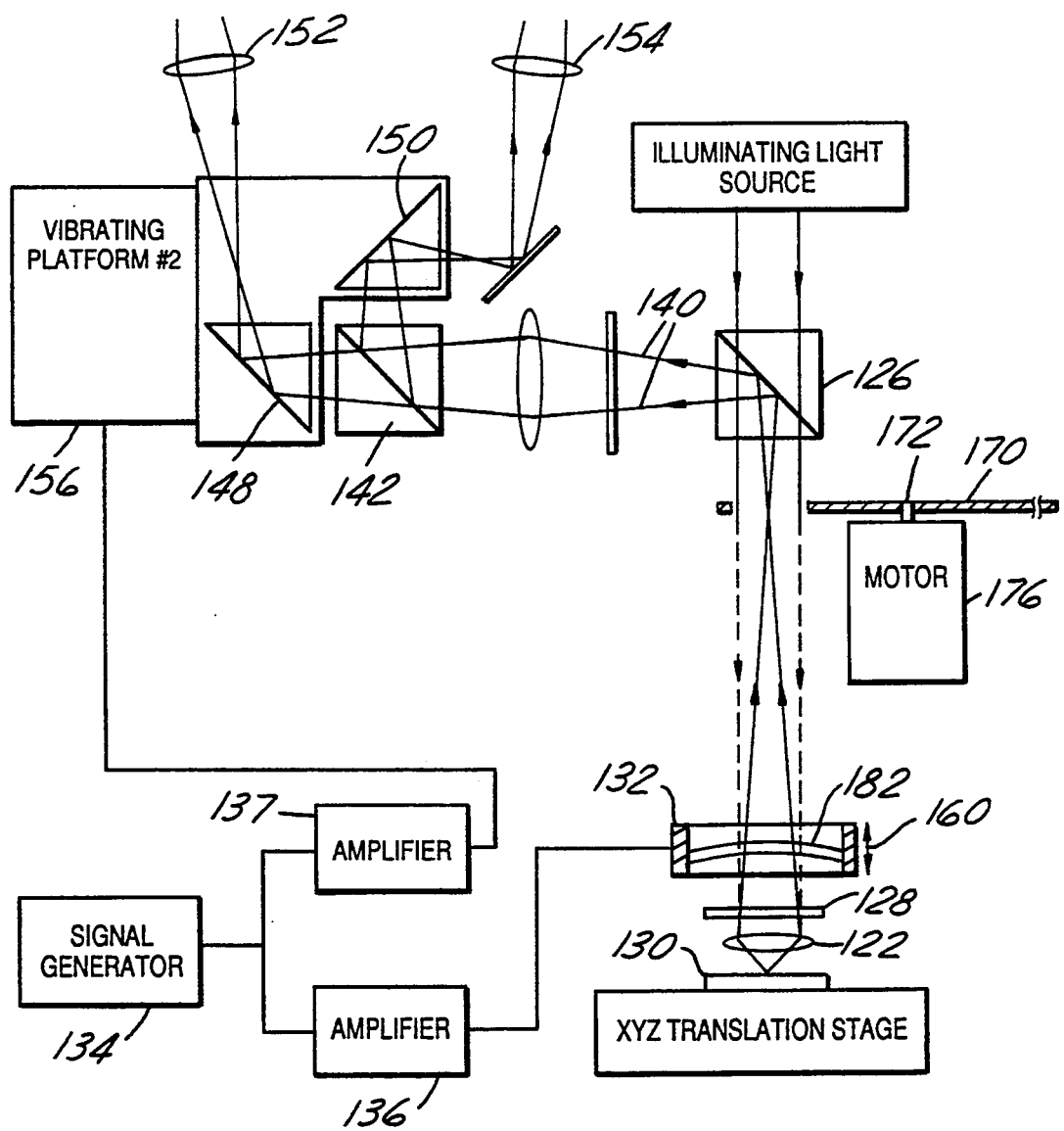
FIG. 10 is a diagrammatic view of a fifth embodiment of the direct-view stereoscopic confocal microscope of the present invention employing a meniscus lens.

An essential feature of the direct-view stereoscopic confocal microscope of the present invention includes the ability to produce rapid variation of the in-focus depth of specimen 130 in conjunction with the ability to vary the parallax of the image in synchronism with the variation of the in-focus depth. In view of the teachings of the present invention, as those skilled in the art of microscopy will appreciate, there are many possible mechanisms capable of accomplishing these ends. For example, FIG. 9 depicts the use of prism 178 and prism reflector 180 for varying the depth of the sample which is in focus. Thus, by attaching prism 178 to first vibrating platform 132, and by vibrating prism 178 along axis 160', the depth of specimen 130 which is in focus is varied. Likewise, the embodiment set out in FIG. 10 varies the depth of specimen 130 which is in-focus by vibrating meniscus lens 182 along axis 160.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. Accordingly, it is to be understood that the subject matter sought to be afforded protection hereby should be deemed to extend to the subject matter defined in the appended claims, including all fair equivalents thereof.

We claim:

1. A direct-view stereoscopic confocal microscope, comprising:
   a light source for illuminating a portion of a specimen,
   an aperture plate optically disposed between said light source and said specimen, said aperture plate including an aperture for passing a portion of the light emanating from said light source onto the portion of said specimen,
   means, optically coupled to said illuminated portion of said specimen, for collecting an image created by said illuminated portion of said specimen,
   first vibrating means coupled to said specimen for vibrating said specimen along a first axis, and
   second vibrating means coupled to said collecting means for vibrating said collecting means along a second axis.

2. The direct-view stereoscopic confocal microscope of claim 1, further including means optically disposed between said light source and said aperture plate, and spaced apart from said aperture plate, for focusing the portion of said light onto said aperture of said aperture plate.

3. The direct-view stereoscopic confocal microscope of claim 2, wherein said aperture plate includes a plurality of apertures and said focusing means includes a plurality of lens means, each said lens means respectively associated with an aperture of said aperture plate, and wherein each said lens means is adapted to focus light emanating from said light source onto its respectively associated aperture in said aperture plate.

4. The direct-view stereoscopic confocal microscope of claim 3, further including rotating means coupled to said aperture plate and said focusing means wherein said rotating means is adapted to rotate said aperture plate and said focusing means in synchronism about a common axis of rotation.

5. The direct-view stereoscopic confocal microscope of claim 1, further including objective means optically disposed between said aperture plate and said specimen for focusing said light passing through said aperture onto said specimen.

6. The direct-view stereoscopic confocal microscope of claim 5, wherein said image collecting means further includes a quarter wave plate disposed between said aperture plate and said objective means and a polarizing beam splitter disposed between said aperture plate and said light source, said quarter wave plate and said polarizing beam splitter adapted to collect said image by separating the light scattered from said specimen from said light emanating from said light source.

7. The direct-view stereoscopic confocal microscope of claim 1, wherein said first and second axes are generally mutually perpendicular.

8. The direct-view stereoscopic confocal microscope of claim 1, wherein said first and second vibrating means vibrate in synchronism.

9. The direct-view stereoscopic confocal microscope of claim 1, wherein said collecting means includes a beam splitter and a pair of 90 degree prisms.

10. The direct-view stereoscopic confocal microscope of claim 1, wherein said collecting means includes a beam splitter and a pair of galvanometers.

11. The confocal microscope of claim 1, wherein said light source provides a source of polarized light.

12. The confocal microscope of claim 11, wherein said light source provides a source of laser light.

* * * * *